United States Patent

Wu et al.

(10) Patent No.: US 7,648,440 B2
(45) Date of Patent: Jan. 19, 2010

(54) METHOD AND APPARATUS TO CONTROL OPERATION OF AN ELECTRO-MECHANICAL TRANSMISSION

(75) Inventors: Peter E. Wu, Brighton, MI (US); John M. Williams, Detroit, MI (US); Thyag Sadasiwan, Ypsilanti, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 374 days.

(21) Appl. No.: 11/626,449

(22) Filed: Jan. 24, 2007

(65) Prior Publication Data

US 2008/0176706 A1 Jul. 24, 2008

(51) Int. Cl.
*H02P 17/00* (2006.01)
*B60W 10/02* (2006.01)
*B60W 10/04* (2006.01)
*G06F 7/00* (2006.01)
*G06F 17/00* (2006.01)
*F16H 31/00* (2006.01)

(52) U.S. Cl. .......................... 477/180; 477/906; 477/15; 477/907; 701/62; 475/119; 903/945

(58) Field of Classification Search .............. 477/180, 477/172, 174, 906, 907, 6–9, 15, 70–72, 477/76, 97, 98; 701/62, 63, 67; 903/945; 475/116–120

See application file for complete search history.

(56) References Cited

U.S. PATENT DOCUMENTS

| 5,643,123 | A | 7/1997 | Jang et al. |
| 5,738,602 | A | 4/1998 | Morita et al. |
| 5,842,144 | A | 11/1998 | Coutant et al. |
| 5,957,800 | A * | 9/1999 | Oba et al. ................... 475/119 |
| 6,022,293 | A | 2/2000 | Dourra et al. |
| 6,375,591 | B1 * | 4/2002 | Wakahara et al. ........... 475/119 |
| 6,966,862 | B2 | 11/2005 | Inuta |
| 7,222,005 | B2 * | 5/2007 | Kang et al. .................... 701/29 |
| 7,426,854 | B2 * | 9/2008 | Endo et al. ............... 73/115.02 |
| 2005/0080527 | A1 | 4/2005 | Tao et al. |
| 2006/0111213 | A1 * | 5/2006 | Bucknor et al. ................ 475/5 |
| 2007/0173373 | A1 * | 7/2007 | Kinugasa et al. ............... 477/3 |
| 2008/0176709 | A1 | 7/2008 | Wu et al. |
| 2008/0182696 | A1 | 7/2008 | Sah et al. |

OTHER PUBLICATIONS

USPTO, Prosecution History for U.S. Appl. No. 11/626,515.

* cited by examiner

*Primary Examiner*—Tisha D Lewis (57) ABSTRACT

A method and apparatus are provided to control operation of an electro-mechanical torque transmission device selectively operative in one of a plurality of fixed gear modes and two continuously variable modes, and operative to transmit torque input from a plurality of torque-generative devices. The transmission device includes a hydraulic circuit and is operative in one of a plurality of operating modes by selective actuation of a plurality of hydraulically-actuated torque-transfer clutches. The method comprises monitoring pressures in the hydraulic circuit, and restricting operation of the transmission when any one of the monitored hydraulic pressures does not correspond to an expected pressure thereat. Presence of a fault is verified during the restricted operation.

28 Claims, 4 Drawing Sheets

METHOD AND APPARATUS TO CONTROL OPERATION OF AN ELECTRO-MECHANICAL TRANSMISSION

TECHNICAL FIELD

This invention pertains generally to control systems for electro-mechanical transmissions, and more specifically to control during clutch transitions.

BACKGROUND OF THE INVENTION

Fuel/electric hybrid powertrain architectures comprise torque-generative devices, including internal combustion engines and electric machines, which transmit torque through a transmission device to a vehicle driveline. One such transmission includes a two-mode, compound-split, electro-mechanical transmission which utilizes an input member for receiving motive torque from an internal combustion engine, and an output member for delivering motive torque from the transmission to the vehicle driveline. The exemplary electro-mechanical transmissions are selectively operative in fixed gear modes and continuously variable modes through actuation of torque-transfer clutches. A fixed gear mode occurs when rotational speed of the transmission output member is a fixed ratio of rotational speed of the input member from the engine, typically due to actuation of one or more torque-transfer clutches. A continuously variable mode occurs when rotational speed of the transmission output member is variable based upon operating speeds of one or more electrical machines. The electrical machines can be connected to the output shaft via actuation of a clutch, or by direct connection. Clutch actuation and deactivation is typically effected through a hydraulic circuit, including electrically-actuated hydraulic flow management valves, pressure control solenoids, and pressure monitoring devices controlled by a control module.

Engineers implementing powertrain systems having electro-hydraulic transmissions are tasked with developing shifting schemes between various operating modes, including the fixed gear modes and the continuously variable modes. Execution of a shift typically potentially includes deactivating an off-going clutch, and/or actuating an oncoming clutch. A control system is typically programmed to execute tasks during shift transitions to effect a smooth shift transition substantially imperceptible to the vehicle operator. A fault may occur in a component of the hydraulic circuit, such as during execution of a shift.

There is a need to for a method and apparatus to control operation of a electro-mechanical transmission upon detection of presence of a fault, to prevent operation of the transmission in an unintended condition, and to maintain unobtrusive operation of the vehicle while confirming existence of the fault, and to prevent premature operator notification.

SUMMARY OF THE INVENTION

There is provided a method, preferably executed in an article of manufacture, and an apparatus, to control a torque transmission device of a powertrain. The torque transmission device comprises an electro-hydraulic circuit operative to selectively actuate torque-transfer clutches by selective control of hydraulic circuit flow control devices. The method comprises monitoring pressures in the hydraulic circuit, and identifying a fault and restricting operation of the torque transmission device when any one of the monitored pressures in the hydraulic circuit does not correspond to an expected pressure thereat. Presence of the fault is verified during the restricted operation.

The invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
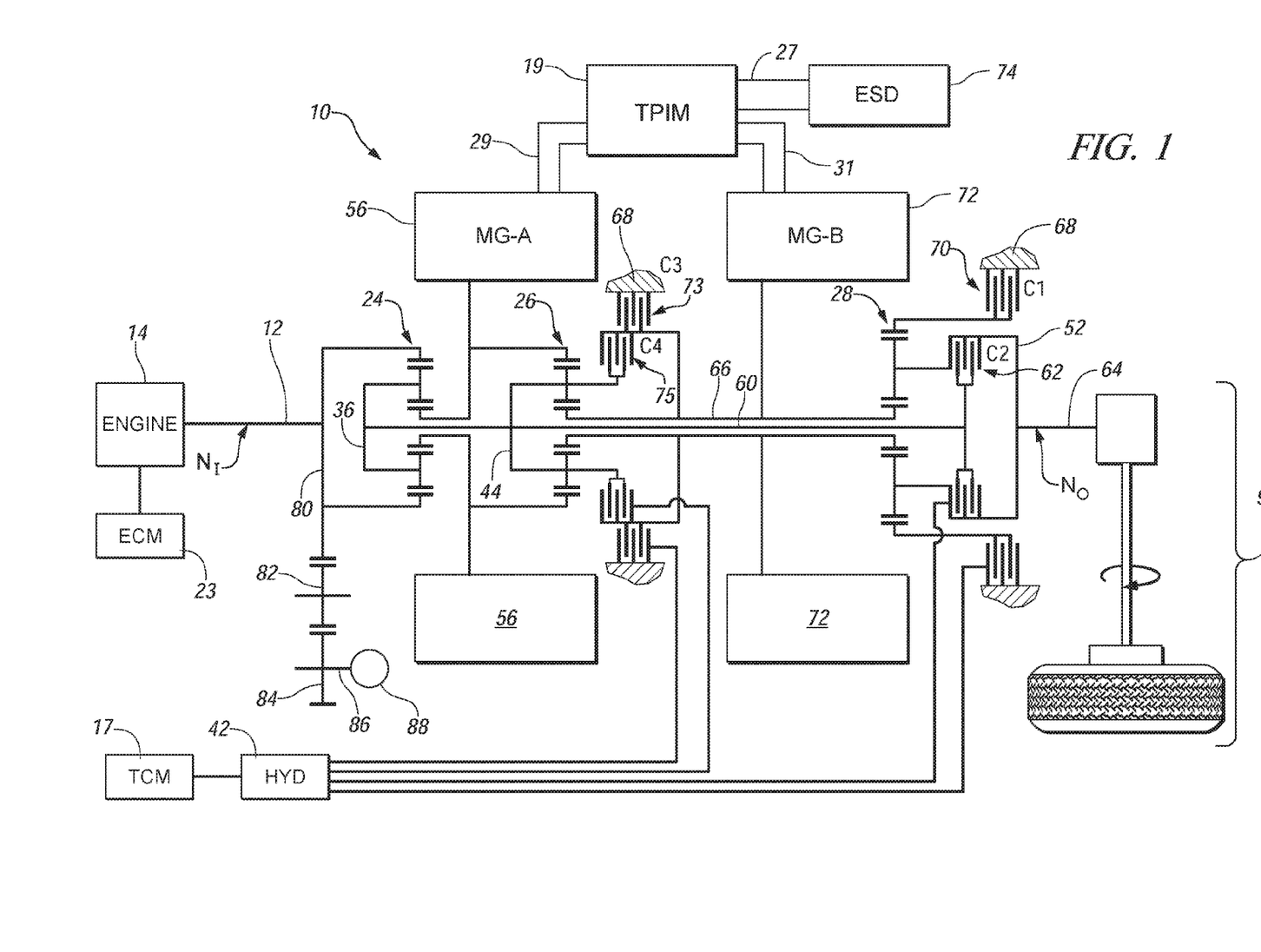
FIG. 1 is a schematic diagram of an exemplary powertrain, in accordance with the present invention.
Figure 2:
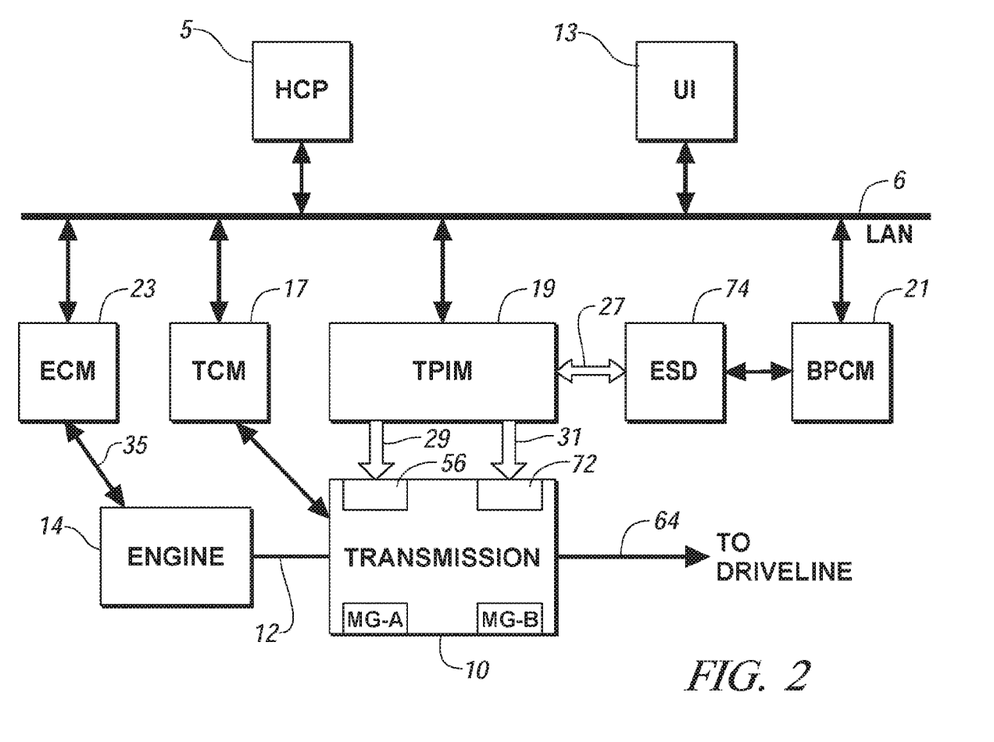
FIG. 2 is a schematic diagram of an exemplary architecture for a control system and powertrain, in accordance with the present invention.

Referring now to the drawings, wherein the depictions are for the purpose of illustrating the invention only and not for the purpose of limiting the same, FIGS. 1 and 2 depict a system comprising an engine 14, transmission 10, control system, and driveline which has been constructed in accordance with an embodiment of the present invention.

Mechanical aspects of exemplary transmission 10 are disclosed in detail in commonly assigned U.S. Pat. No. 6,953,409, entitled "Two-Mode, Compound-Split, Hybrid Electro-Mechanical Transmission having Four Fixed Ratios", which is incorporated herein by reference. The exemplary two-mode, compound-split, electro-mechanical hybrid transmission embodying the concepts of the present invention is depicted in FIG. 1, and is designated generally by the numeral 10. The transmission 10 has an input shaft 12 that is preferably directly driven by an internal combustion engine 14. The transmission 10 utilizes three planetary-gear sets 24, 26 and 28, and four torque-transmitting devices, i.e. clutches C1 70, C2 62, C3 73, and C4 75. An electro-hydraulic control system 42, preferably controlled by transmission control module 17, is operative to control actuation and deactivation of the clutches. Clutches C2 and C4 preferably comprise hydraulically-actuated rotating friction clutches. Clutches C1 and C3 preferably comprise comprising hydraulically-actuated stationary devices grounded to the transmission case 68.

The three planetary gear sets 24, 26 and 28 each comprise simple planetary gear sets. Furthermore, the first and second planetary gear sets 24 and 26 are compounded in that the inner gear member of the first planetary gear set 24 is conjoined to an outer gear member of the second planetary gear set 26, and connected to a first electrical machine comprising a motor/generator 56, also referred to as "MG-A".

The planetary gear sets 24 and 26 are further compounded in that carrier 36 of the first planetary gear set 24 is conjoined through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through clutch C2 62. The carrier 52 of the third planetary gear set 28 is connected directly to the transmission output member 64. An inner gear member of the second planetary gear set 26 is connected to an inner gear member of the third planetary gear set 28 through a sleeve shaft 66 that circumscribes shaft 60, and is connected to a second electrical machine comprising a motor/generator 72, referred to as MG-B.

All the planetary gear sets 24, 26 and 28 as well as MG-A and MG-B 56 and 72 are coaxially oriented, as about the axially disposed shaft 60. MG-A and MG-B 56 and 72 are both of an annular configuration which permits them to circumscribe the three planetary gear sets 24, 26 and 28 such that the planetary gear sets 24, 26 and 28 are disposed radially inwardly of the MG-A and MG-B 56 and 72. Transmission output member 64 is operably connected to a vehicle driveline 90 to provide motive torque. Each clutch is preferably hydraulically actuated, receiving pressurized hydraulic fluid from a pump, described below, via an electro-hydraulic control circuit 42 described hereinbelow with reference to FIG. 4.

The transmission 10 receives input motive torque from the torque-generative devices, including the engine 14 and the MG-A 56 and MG-B 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC transfer conductors 27. The TPIM 19 is an element of the control system described hereinafter with regard to FIG. 2. The TPIM 19 transmits electrical energy to and from MG-A 56 by transfer conductors 29, and the TPIM 19 similarly transmits electrical energy to and from MG-B 72 by transfer conductors 31. Electrical current is transmitted to and from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality.

In motoring control, the respective inverter receives current from the DC transmission lines and provides AC current to the respective electrical machine, i.e. MG-A and MG-B, over transfer conductors 29 and 31. In regeneration control, the respective inverter receives AC current from the electrical machine over transfer conductors 29 and 31 and transmits current to the DC lines 27. The net DC current provided to or from the inverters determines the charge or discharge operating mode of the electrical energy storage device 74. Preferably, MG-A 56 and MG-B 72 are three-phase AC machines each having a rotor operable to rotate within a stator that is mounted on a case of the transmission. The inverters comprise known complementary three-phase power electronics devices.

Referring now to FIG. 2, a schematic block diagram of the control system, comprising a distributed control module architecture, is depicted. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain including the transmission 10 through a request for a torque output. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules. The specific communication protocol utilized is application-specific. The LAN bus and appropriate protocols provide for robust messaging and multi-control module interfacing between the aforementioned control modules, and other control modules providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an operator torque request, an engine torque command, clutch torque commands for the various clutches C1, C2, C3, C4 of the transmission 10; and motor torque commands for MG-A and MG-B. The TCM is operatively connected to the electro-hydraulic control circuit 42 of FIGS. 1 and 4 to monitor various pressure sensing devices, and generate and execute control signals for various solenoids and control valves contained therein.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command from the HCP 5, and generates a desired axle torque, and an indication of actual engine torque input to the transmission, which is communicated to the HCP 5. For simplicity, ECM 23 is depicted generally having bi-directional interface with engine 14 via aggregate line 35. Various other parameters that may be sensed by ECM 23 include engine coolant temperature, engine input speed, $N_I$, to shaft 12 leading to the transmission, manifold pressure, ambient air temperature, and ambient pressure. Various actuators that may be controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques for each of the clutches C1, C2, C3, and, C4 and rotational speed, $N_O$, of the output shaft 64. Other actuators and sensors may be used to provide additional information from the TCM to the HCP for control purposes. The TCM 17 monitors inputs from pressure switches ('PS') and selectively actuates pressure control solenoids and shift solenoids to actuate various clutches to achieve various transmission operating modes, as described hereinbelow.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power.

The Transmission Power Inverter Module (TPIM) 19 includes previously referenced power inverters and motor control modules configured to receive motor control commands and control inverter states therefrom to provide motor drive or regeneration functionality. The TPIM 19 is operable to generate torque commands for MG-A 56 and MG-B 72, based upon input from the HCP 5, which is driven by operator input through UI 13 and system operating parameters. The motor torque commands for MG-A and MG-B are implemented by the control system, including the TPIM 19, to control MG-A and MG-B. Individual motor speed signals for MG-A and MG-B are derived by the TPIM 19 from the motor phase information or conventional rotation sensors. The TPIM 19 determines and communicates motor speeds to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned control modules is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the UI 13, the supervisory HCP control module 5 and one or more of the other control modules determine requested output torque at shaft 64, also referred to as the operator torque request. Selectively operated components of the transmission 10 are appropriately controlled and manipulated to respond to the operator demand. For example, in the exemplary embodiment depicted in FIGS. 1 and 2, when the operator has selected a forward drive range and manipulates either the accelerator pedal or the brake pedal, the HCP 5 determines an output torque which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The exemplary two-mode, compound-split, electro-mechanical transmission operates in several fixed gear operating modes and continuously variable operating modes, described with reference to FIG. 1, and Table 1, below.

TABLE 1

| Transmission Operating Mode | Actuated Clutches | |
|---|---|---|
| Mode I | C1 70 | |
| Fixed Ratio 1 (GR1) | C1 70 | C4 75 |
| Fixed Ratio 2 (GR2) | C1 70 | C2 62 |
| Mode II | C2 62 | |
| Fixed Ratio 3 (GR3) | C2 62 | C4 75 |
| Fixed Ratio 4 (GR4) | C2 62 | C3 73 |

The various transmission operating modes described with reference to Tables 1 and 2 indicate which of the specific clutches C1, C2, C3, and C4 are engaged or actuated for each operating mode. Additionally, in various transmission operating modes, MG-A and MG-B may each operate as an electrical motor to generate motive torque, or as a generator to generate electrical energy. Other factors outside the scope of the invention affect when the electrical machines 56, 72 operate as motors and generators, and are not discussed herein.

The control system, depicted primarily in FIG. 2, is operable to provide a range of transmission output speeds at shaft 64 from relatively slow to relatively fast within each mode of operation. The combination of two modes with a slow-to-fast output speed range in each mode allows the transmission 10 to propel a vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 62 or C2 70, and by the controlled speed and torque of the electrical machines 56 and 72, which can be referred to as a continuously variable transmission mode. Certain ranges of operation are described below in which fixed ratios are achieved by applying an additional clutch. This additional clutch may be clutch C3 73 or C4 75, as shown in the table, above.

When the additional clutch is applied, fixed ratio operation of input-to-output speed of the transmission, i.e. $N_I/N_O$, is achieved. The rotations of machines MG-A and MG-B 56, 72 are dependent on internal rotation of the mechanism as defined by the clutching and proportional to the input speed measured at shaft 12. The machines MG-A and MG-B function as motors or generators. They are completely independent of engine to output power flow, thereby enabling both to be motors, both to function as generators, or any combination thereof. This allows, for instance, during operation in Fixed Ratio 1 that motive power output from the transmission at shaft 64 is provided by power from the engine and power from MG-A and MG-B, through planetary gear set 28 by accepting power from ESD 74.

Figure 3:
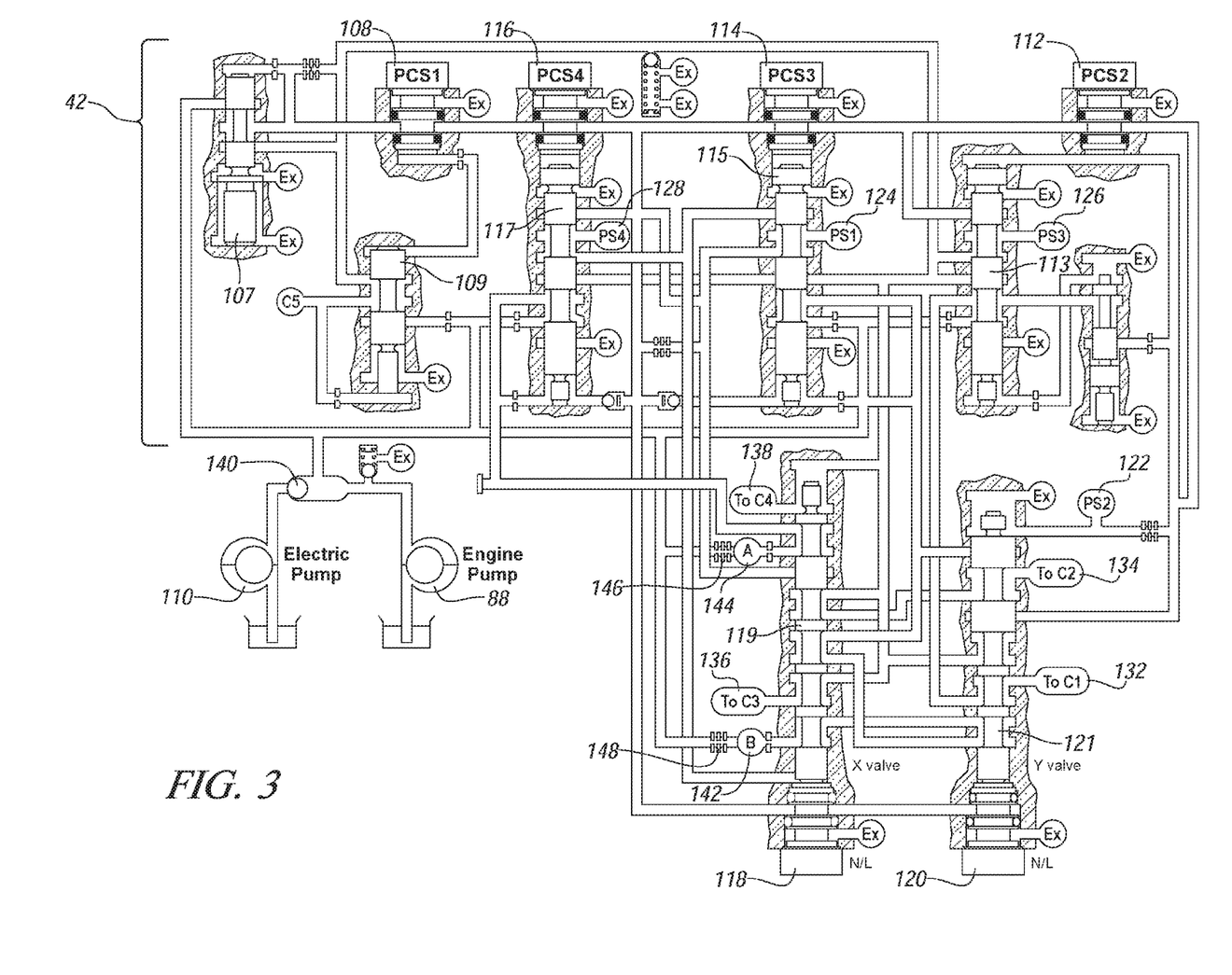
FIG. 3 is a schematic diagram of a hydraulic circuit, in accordance with the present invention.

Referring to FIG. 3, a schematic diagram is depicted which provides a more detailed description of the exemplary electro-hydraulic system for controlling flow of hydraulic fluid in the exemplary transmission. The main hydraulic pump 88, driven off the input shaft from the engine 10, and auxiliary pump 110, operatively electrically controlled by the TPIM 19, provide pressurized fluid to the hydraulic circuit 42 through valve 140. The auxiliary pump 110 preferably comprises an electrically-powered pump of an appropriate size and capacity to provide sufficient flow of pressurized hydraulic fluid into the hydraulic system when operational. Pressurized hydraulic fluid flows into electro-hydraulic control circuit 42, which is operable to selectively distribute hydraulic pressure to a series of devices, including the torque-transfer clutches C1 70, C2 62, C3 73, and C4 75, cooling circuits for machines A and B, and a circuit for cooling and lubricating the transmission 10 via passages 142, 144 (not depicted in detail). As previously stated, the TCM 17 is preferably operable to actuate the various clutches to achieve various transmission operating modes through selective actuation of hydraulic circuit flow control devices comprising pressure control solenoids ('PCS') PCS1 108, PCS2 112, PCS3 114, PCS4 116 and solenoid-controlled flow management valves X-valve 118 and Y-valve 120. The circuit is fluidly connected to pressure switches PS1, PS2, PS3, and PS4 via passages 124, 122, 126, and 128, respectively. The pressure control solenoid PCS1 108 has control positions of neutral and high and is operative to provide modulation of fluidic pressure in the hydraulic circuit through fluidic interaction with valve 109. Pressure control solenoid PCS2 112 has control positions of neutral and low, and is fluidly connected to spool valve 113 and operative to effect flow therethrough when actuated. Spool valve 113 is fluidly connected to pressure switch PS3 via passage 126. Pressure control solenoid PCS3 114 has control positions of neutral and high, and is fluidly connected to spool valve 115 and operative to effect flow therethrough when actuated. Spool valve 115 is fluidly connected to pressure switch PS1 via passage 124. Pressure control solenoid PCS4 116 has control positions of neutral and low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have controlled operating states of High ('1') and Low ('0'). The controlled operating states reference positions of each valve effecting flow control to different flow control devices in the hydraulic circuit 42 and the transmission 10. The X-valve 119 is operable to direct pressurized fluid to clutches C3 and C4 and cooling systems for stators of MG-A and MG-B via fluidic passages 136, 138, 144, 142 respectively, depending upon the source of the fluidic input, as is described hereinafter. The Y-valve 121 is fluidly connected to PS2 via passage 122, and is operable to direct pressurized fluid to clutches C1 and C2 via fluidic passages 132 and 134 respectively, depending upon the source of the fluidic input, as is described hereinafter. A more detailed description of the exemplary electro-hydraulic control circuit 42 is provided in commonly assigned and co-pending U.S. patent application Ser. No. 11/263,216, entitled "A Multiplexed Pressure Switch System for an Electrically Variable Hybrid Transmission", which is incorporated herein by reference.

An exemplary logic table to accomplish control of the exemplary electro-hydraulic control circuit 42 is provided with reference to Table 2, below.

TABLE 2

| Operating State | X-Valve Logic | Y-Valve Logic | PCS1 | PCS2 | PCS3 | PCS4 |
| --- | --- | --- | --- | --- | --- | --- |
| | No Latch | C2 Latch | Neutral/ High | Neutral/ High | Neutral/ High | Neutral/ Low |
| Mode I | 0 | 0 | LM | MG-B Stator Cool | C1 | MG-A Stator Cool |
| Mode II | 0 | 1 | LM | C2 | MG-B Stator Cool | MG-A Stator Cool |
| Low Range | 1 | 0 | LM | C2 | C1 | C4 |
| High Range | 1 | 1 | LM | C2 | C3 | C4 |

Selective control of the X and Y valves and actuation of the solenoids PCS2, PCS3, and PCS4 facilitate flow of hydraulic fluid to actuate clutches C1, C2, C3, and C4, and provide cooling for the stators of MG-A and MG-B.

Figure 4:
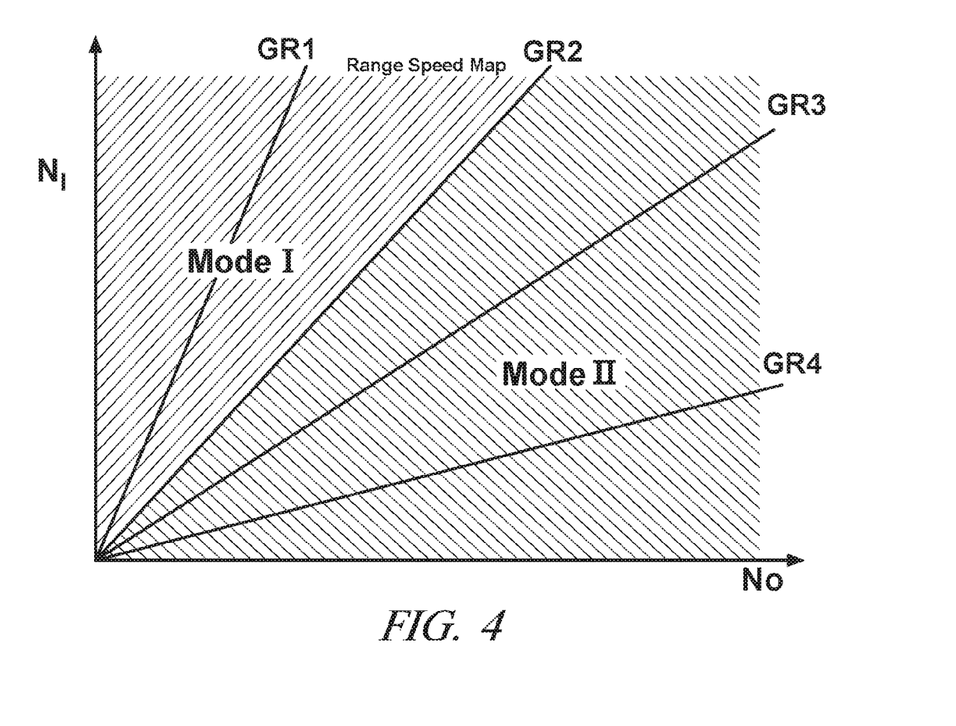
FIG. 4 is a graphical depiction, in accordance with the present invention.

Referring now to FIG. 4, various transmission operating modes are plotted as a function of transmission output speed, $N_O$, and transmission input speed, $N_I$, for the exemplary transmission and control system depicted in FIGS. 1 and 2. The Fixed Ratio operation is shown as individual lines for each of the specific gear ratios, GR1, GR2, GR3, and GR4, as described with reference to Table 1, above. The continuously variable Mode operation is shown as ranges of operation for each of Mode I and Mode II. The transmission operating mode is switched between Fixed Ratio operation and continuously variable Mode operation by activating or deactivating specific clutches. The control system is operative to determine a specific transmission operating mode based upon various criteria, using algorithms and calibrations executed by the control system, and is outside the scope of this invention. Selection of the mode of operation of the transmission depends primarily on operator input and the ability of the powertrain to meet that input.

Referring to Tables 1 and 2 and again to FIG. 4, the low range operating state includes selective actuation of clutches C2, C1, and C4, facilitating operation in any one of continuously variable Mode I, and fixed gears GR1, GR2, and GR3. The high range operating state includes selective actuation of clutches C2, C3, and C4, facilitating operation in any one of continuously variable Mode II and fixed gears GR3 and GR4. It should be recognized that ranges of continuously variable operation for Mode I and Mode II may overlap.

Referring now to Table 3, below, a table comprising expected signal output states of the pressure switches PS1, PS2, PS3, and PS4 in the exemplary electro-hydraulic control circuit 42 is provided for various transmission operating modes. Each of the pressure switches PS1, PS2, PS3, PS4 have hydraulic output states of 0=Off and 1=On, wherein the state transition occurs at a threshold appropriate to the hydraulic circuit. In this embodiment, the state transition preferably occurs at about 140 kPa (50 psi), meaning that output state of each pressure switch is "0" or Off when the monitored hydraulic pressure is less than 140 kPa and the output state of each pressure switch is "1" or On when the monitored hydraulic pressure is greater than 140 kPa. 'LM' indicates the PCS1 is used for line pressure modulation.

TABLE 3

| Operating Mode | X Logic Valve (N/L) | Y Logic Valve (N/L) | Pressure Switch Hydraulic State (0-Off/1-On) PS1/PS2/ PS3/PS4 | PCS1 N/H | PCS2 N/H | PCS3 N/H | PCS4 N/L |
|---|---|---|---|---|---|---|---|
| Elec Low | 0 | 0 | 1 0 0 0 | LM | B Stator | C1 (On) | A Stator |
| Reverse | 0 | 0 | 1 0 0 0 | LM | C2 (Off) | C1 (On) | C4 (Off) |
| Neutral | 0 | 0 | 0 0 0 0 | LM | B Stator Off | C1 (Off) | A Stator Off |
| Mode I | 0 | 0 | 1 0 0 0 | LM | B Stator Off | C1 (On) | A Stator Off |
| GR1 | 1 | 0 | 1 0 0 1 | | C2 (Off) | C1 (On) | C4 (On) |
| GR2 | 1 | 0 | 1 0 1 0 | | C2 (On) | C1 (On) | C4 (Off) |
| GR3 Lo Range | 1 | 0 | 0 0 1 1 | | C2 (On) | C1 (Off) | C4 (On) |
| GR3 Hi Range | 1 | 1 | 0 1 1 1 | | C2 (On) | C3 (Off) | C4 (On) |
| GR4 | 1 | 1 | 1 1 1 0 | | C2 (On) | C3 (On) | C4 (Off) |
| Mode II | 0 | 1 | 0 1 1 0 | | C2 (On) | B Stator Off | A Stator Off |

In operation, a shift occurs in the exemplary transmission due to a variety of operating characteristics of the powertrain. There may be a change in demand for an operator demand for torque. Such demands are typically communicated through inputs to the UI 13 as previously described. Additionally, a change in demand for output torque may be predicated on a change in external conditions, including, e.g., changes in road grade, road surface conditions, or wind load. A shift change may be predicated on a change in powertrain torque demand caused by a control module command to change one of the electrical machines between electrical energy generating mode and torque generating mode. A shift change may be predicated on a change in an optimization algorithm or routine operable to determine optimum system efficiency based upon operator demand for power, battery state of charge, and energy efficiencies of the engine 14 and MG-A and MG-B 56, 72. The control system manages torque inputs from the engine 14 and MG-A and MG-B 56, 72 based upon an outcome of the executed optimization routine, and there can be changes in system optimization that compel a shift change in order to optimize system efficiencies to improve fuel economy and manage battery charging. Furthermore, a shift change may be predicated upon a fault in a component or system. The distributed control module architecture acts in concert to determine a need for a change in the transmission operating mode, and executes the forgoing to effect the change in transmission operation. A shift change in the exemplary system comprises one of at least three possible situations. There can be a shift from one fixed gear to a second fixed gear. There can be a shift from a fixed gear to one of the continuously variable modes. There can be a shift from one of the continuously variable modes to a fixed gear.

Figure 5:
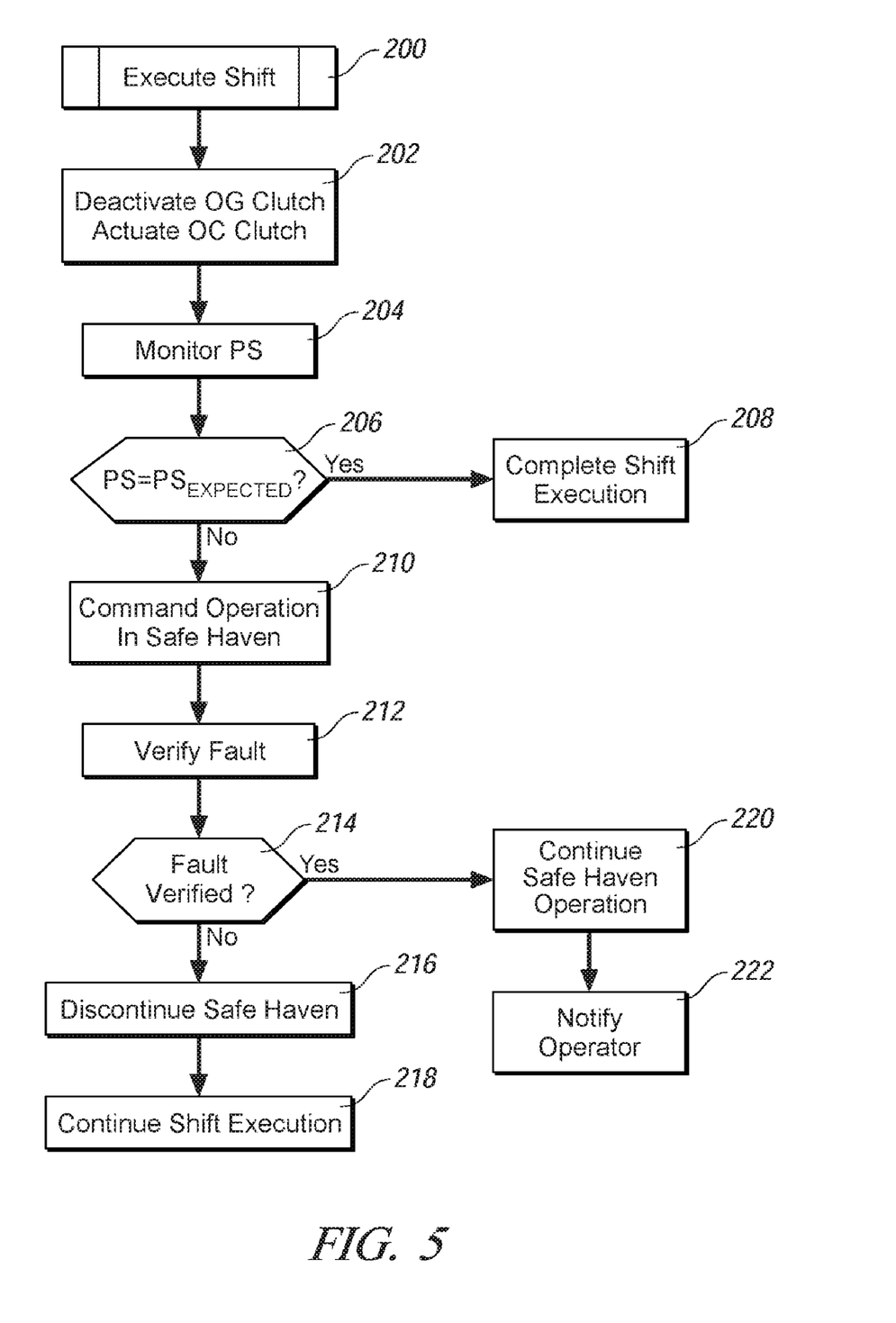
FIG. 5 is a logic flowchart, in accordance with the present invention.

Referring now to FIG. 5, a preferred method of controlling a hybrid powertrain system, described with reference to operating the exemplary powertrain of FIGS. 1, 2, and 3, is now provided. The invention generally comprises an algorithm, resident in one of the control modules of the distributed control module architecture and executed therein, which acts to limit operation of the transmission to a restricted mode upon an indication of a fault. The invention is described with reference to a shift execution, but it is understood that the action described herein is applicable to any instance wherein a clutch is being actuated or deactivated, wherein there is an indication of a clutch unexpectedly being actuated or remaining actuated after a command to deactivate.

A command to execute a shift from one operating mode to a second operating mode occurs during ongoing operation (Block 200). Executing each shift generally comprises one of the following: deactivating an off-going ('OG') clutch; actuating an oncoming ('OC') clutch; and, a combination of deactivating an off-going ('OG') clutch and actuating an oncoming ('OC') clutch (Block 202). Deactivating the OG clutch generally results in an action to off-load clutch torque from the OG clutch, and a command to deactivate the OG clutch as part of overall shift execution. Commands to deactivate the OG clutch and actuate the OC clutch typically originate in the HCP 5 and are communicated to the TCM 17, which interprets the commands by selectively activating or deactivating the related pressure control solenoid PCS1 112, PCS2 114, PCS3 116 and/or XY valves 118, 120 in the electro-hydraulic circuit. A command to actuate the OC clutch generally includes actions to increase hydraulic pressure to the OC clutch device to effect a smooth transition.

The TCM monitors deactivation of the OG clutch and actuation of the OC clutch by monitoring signal outputs of all the pressure switch devices ('PS'), e.g. devices 122, 124, 126 and 128 of FIG. 3, to verify that the OG clutch has deactivated and the OC clutch is ready to be actuated, and to verify that no other action has occurred such as may cause inadvertent or unexpected actuation or deactivation of one of the clutches (Block 204). The pressure switch outputs are compared to expected outputs ("$PS_{EXPECTED}$") of the related pressure switch, with expected outputs as shown with reference to Table 3, above (Block 206).

A fault is typically initially indicated by an unexpected reading from one of the pressure switches, shown with reference to Table 3 for this embodiment. An indicated fault is communicated to the TCM and the HCP. When a fault is not detected, execution of the shift is completed (Block 208).

A fault can be identified in the electro-hydraulic control circuit related to a clutch actuation event, a clutch deactivation event, or a clutch slippage event during a shift or vehicle launch. During a clutch actuation event, a fault is preferably identified in the hydraulic circuit when any one of the output states of the pressure switches does not match the expected state after an elapsed time of about 150 milliseconds. During a clutch deactivation event, a fault is preferably identified in the hydraulic circuit when any one of the output states of the pressure switches does not match the expected state after an elapsed time of about one second. During a clutch slippage event, a fault is preferably identified in the hydraulic circuit when any one of the output states of the pressure switches does not match the expected state after an elapsed time of about two seconds. A hydraulic circuit fault may comprise a stuck spool valve, a malfunctioning solenoid valve, a faulty pressure switch, a wiring harness malfunction, debris in a hydraulic line, and others.

When a fault is detected based upon signal output from one of the pressure switches, the transmission is commanded to operate in a restricted operating mode, referred to as "safe haven", preferably within an elapsed time of 150 milliseconds of initial detection of the fault (Block 210). The safe haven mode comprises permitting operation of the transmission only in specific operating modes, and, accordingly prohibiting operation of the transmission any other mode. There are at least three permissible safe haven modes. A first safe haven mode comprises permissible operation only in GR1, GR2 and Mode I, and is selectable when a fault related to actuation of clutch C3 or PCS3 occurs. A second safe haven mode comprises permissible operation only in GR3, GR4, and Mode II, and is selectable when a fault related to clutch C1 occurs. A third safe haven mode comprises permissible operation only in Mode I and Mode II, and is selectable when a fault related to either of clutches C3 and C4 occurs. The HCP preferably controls operation in the safe haven mode for the remainder of the current operating cycle, i.e. until the vehicle is stopped and restarted.

While operating in the safe haven mode, the HCP controls operation of the engine and machines MG-A and MG-B to maintain torque output of the transmission to the vehicle driveline. In this embodiment, the 'safe haven' mode is preferably effected by selectively changing control state of the X-valve solenoid 118 from High ('1') to Low ('0'), or vice-versa.

While the transmission is operating in the safe haven mode, the control system verifies the presence of the fault (Block 212). Clutch deactivation can be verified by monitoring a relationship between the input speed, $N_I$, and the output speed $N_O$, albeit after a time delay. Fault verification can include selective actuation of the PCS device related to the fault during safe haven operation, and monitoring an expected outcome.

When the fault is not verified (Block 214), i.e. not reproduced during operation in the restricted mode, the command to operate the transmission in the restricted mode is disabled (Block 216), and the control system resumes normal operation of the transmission, including continuing the shift execution (Block 218). When the fault is verified, the control system continues commanding operation of the transmission in the restricted mode (Block 220), and notifies the vehicle operator of the fault, including illuminating a service lamp on a vehicle instrument panel (Block 222).

By way of example, when the exemplary transmission is operating in GR1, clutches C1 and C4 are actuated. When a command to shift to GR2 is executed, clutch C4 is commanded to deactivate by deactivating solenoid PCS4. When output from pressure switch PS4 indicates a drop in pressure when PCS4 is deactivated, the shift execution continues. However, when output from pressure switch PS4 does not indicate a drop in pressure when PCS4 is deactivated, then the X-valve 118 is commanded to Low state, or "0", thus effecting operation in continuously variable Mode II, as shown with reference to Table 2, above. While the transmission is operating in Mode II, the control system verifies the presence of the fault in PCS4 by selectively actuating PCS4 and determining whether the commanded cooling of the stator of MG_A is occurring (See Table 2), based upon feedback from temperature sensors (not depicted) operable to monitor temperature of the stator of MG_A.

When presence of the fault is not verified, i.e. not reproduced during operation in the restricted mode, the command to operate the transmission in Mode II is disabled, and the control system resumes normal operation of the transmission. When presence of the fault is verified, the control system continues commanding operation of the transmission in Mode II, and notifies the vehicle operator of the fault, including illuminating the service lamp on the instrument panel in the vehicle.

It is understood that modifications in the transmission hardware are allowable within the scope of the invention. The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method to control a powertrain system including an internal combustion engine, electrical machines and an electro-mechanical transmission device configured to transmit torque to an output shaft, the transmission device comprising a plurality of torque-transfer clutches each actuable by selective control of a hydraulic circuit comprising a plurality of flow control devices and pressure monitoring devices, the method comprising:
   controlling the flow control devices;
   monitoring pressures in the hydraulic circuit;
   identifying a fault in the transmission device when any one of the monitored pressures in the hydraulic circuit does not correspond to an expected pressure thereat;
   restricting operation of the transmission device and controlling operation of the internal combustion engine and the electrical machines to maintain a torque output to the output shaft; and,
   verifying presence of the fault during the restricted operation.

2. The method of claim 1, wherein monitoring pressures in the hydraulic circuit comprises monitoring outputs of the pressure monitoring devices.

3. The method of claim 2, wherein identifying a fault further comprises determining when any one of the outputs of the pressure monitoring devices does not match an expected output.

4. The method of claim 2, wherein monitoring pressures further comprises monitoring outputs of the pressure monitoring devices during actuation of an oncoming clutch and during deactivation of an off-going clutch.

5. The method of claim 4, wherein identifying a fault further comprises detecting when any one of the outputs of the pressure monitoring devices does not match an expected output after an elapsed time of about 150 milliseconds during actuation of the oncoming clutch.

6. The method of claim 4, wherein identifying a fault further comprises detecting when any one of the outputs of the pressure monitoring devices does not match an expected output after an elapsed time of about one second during deactivation of the off-going clutch.

7. The method of claim 2, wherein monitoring pressures further comprises one of monitoring outputs of the pressure monitoring devices during a clutch slippage event.

8. The method of claim 7, wherein identifying a fault further comprises detecting when any one of the outputs of the pressure monitoring devices does not match an expected output after an elapsed time of about two seconds during the clutch slippage event.

9. The method of claim 2, wherein restricting operation of the transmission device comprises operating the transmission only in specific operating modes when one of the monitored pressures does not correspond to an expected pressure thereat.

10. The method of claim 9, wherein the specific operating modes comprise one of a first fixed gear, a second fixed gear, and a first continuously variable mode.

11. The method of claim 9, wherein the specific operating modes comprise one of a third fixed gear, a fourth fixed gear, and a second continuously variable mode.

12. The method of claim 9, wherein the specific operating modes comprise one of a first continuously variable mode and a second continuously variable mode.

13. The method of claim 1, further comprising:
restricting operation of the transmission by selectively operating the transmission in one of two continuously variable modes; and,
verifying presence of a fault during the restricted operation by selectively actuating one of the hydraulic circuit flow control devices whereat the monitored pressure does not correspond to the expected pressure and monitoring an output thereat.

14. The method of claim 13, wherein selectively actuating one of the hydraulic circuit flow control devices comprises changing an operating state of a flow management valve of the hydraulic circuit.

15. The method of claim 13, wherein selectively actuating one of the hydraulic circuit flow control devices comprises selectively actuating a pressure control solenoid operative to effect actuation in the hydraulic circuit whereat the monitored pressure does not correspond to the expected pressure.

16. The method of claim 13, wherein verifying presence of a fault during the restricted operation comprises selectively actuating a pressure control solenoid and monitoring temperature of a stator of one of the electrical machines configured to transmit torque to the transmission device.

17. The method of claim 13, further comprising discontinuing the restricted operation of the transmission when the presence of a fault is not verified during the restricted operation.

18. The method of claim 13, further comprising continuing the restricted operation of the transmission when the presence of a fault is verified.

19. Article of manufacture, comprising a storage medium having a computer program encoded therein for effecting a method to control a powertrain system including an internal combustion engine, electrical machines and an electro-mechanical transmission device configured to transmit torque to an output shaft, the transmission device comprising a plurality of torque-transfer clutches each actuable by selective control of a hydraulic circuit comprising a plurality of flow control devices and pressure monitoring devices, the computer program comprising:
code to monitor pressures in the hydraulic circuit;
code to identify a fault in the torque transmission device when any one of the monitored pressures in the hydraulic circuit does not correspond to an expected pressure thereat;
code to restrict operation of the transmission device and controlling operation of the internal combustion engine and the electrical machines to maintain a torque output to the output shaft; and,
code to verify presence of the fault during the restricted operation.

20. The article of manufacture of claim 19, wherein the code to monitor pressures in the hydraulic circuit comprises code to monitor signal outputs from pressure sensing devices each substantially near one of the torque-transfer clutches.

21. The article of manufacture of claim 19, wherein the code to restrict operation of the transmission device comprises code to selectively operate the transmission in one of two continuously variable modes.

22. The article of manufacture of claim 21, further comprising code to change an operating state of a flow management valve of the hydraulic circuit to selectively operate the transmission in one of the two continuously variable modes.

23. Apparatus, comprising:
an internal combustion engine and first and second electrical machines and an electro-mechanical transmission operative to transmit torque therebetween and transmit torque to an output shaft;
the transmission comprising an electro-hydraulic control circuit comprising a plurality of pressure monitoring devices and a plurality of selectively controllable flow control devices, and, a plurality of torque-transfer clutches; the transmission operative in one of a plurality of operating modes comprising fixed gear ratio modes and two continuously variable modes; and
a control system configured to:
control the flow control devices of the electro-hydraulic control circuit; and,
execute a computer program to selectively control the flow control devices of the electro-hydraulic control circuit during execution of a shift, comprising:
code to monitor hydraulic pressures in the hydraulic circuit;
code to identify a fault and restrict operation of the transmission when any one of the monitored hydraulic pressures in the hydraulic circuit does not correspond to an expected pressure thereat;
code to control operation of the internal combustion engine and the first and second electrical machines to maintain a torque output to the output shaft during the restricted operation of the transmission; and,
code to verify presence of the fault in the hydraulic circuit during the restricted operation.

24. The apparatus of claim 23, wherein the selectively controllable flow control devices comprise a plurality of pressure control solenoids and two flow management spool valves operative to selectively actuate the torque-transfer clutches to effect operation in one of the plurality of operating modes comprising fixed gear ratio modes and two continuously variable modes.

25. The apparatus of claim 23, wherein the pressure monitoring devices each comprises a pressure monitoring switch.

26. The apparatus of claim 23, wherein the control system adapted to execute a computer program comprising code to verify the presence of a fault during the restricted operation further comprises code to selectively actuate one of the pressure control solenoids, and, code to monitor operation of the transmission.

27. The apparatus of claim 23, wherein the electro-mechanical transmission further comprises a two-mode, compound-split, electro-mechanical device operative to transmit torque between the internal combustion engine, the first and second electrical machines, and the output shaft to generate the torque output in response to an operator request for torque output.

28. The apparatus of claim 23, wherein a fault in the hydraulic circuit comprises any one of a stuck flow control device, a malfunctioning solenoid device, a faulty pressure monitoring device, a wiring harness fault, and, presence of debris in a hydraulic line.

* * * * *